Patented July 14, 1942

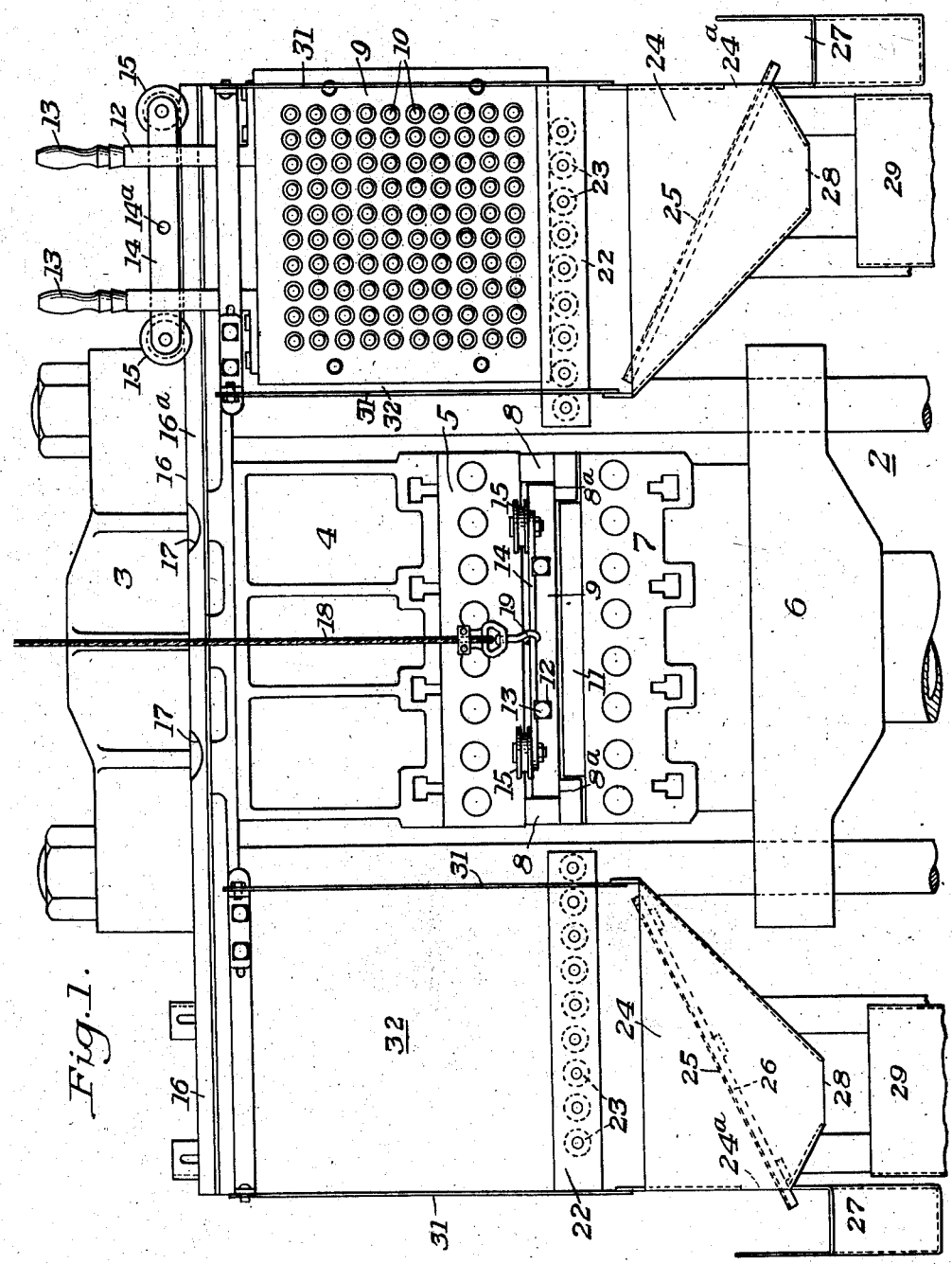

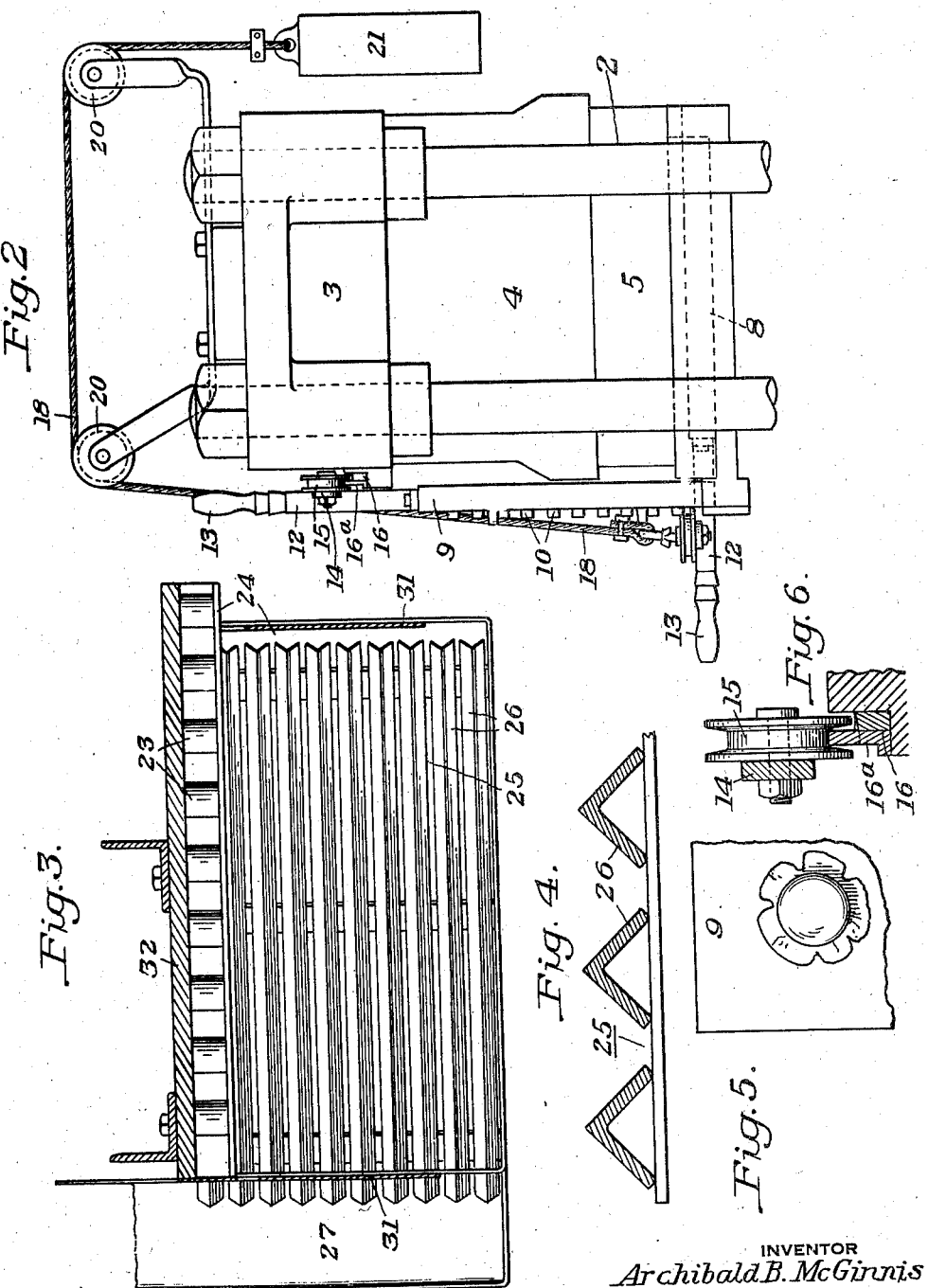

2,289,671

UNITED STATES PATENT OFFICE 2,289,671

PRESS FOR THE MANUFACTURE OF PLASTIC ARTICLES

Archibald B. McGinnis and William B. Merinar, Wheeling, W. Va., assignors to Wheeling Stamping Company, Wheeling, W. Va., a corporation of West Virginia Application October 8, 1938, Serial No. 233,976

14 Claims. (Cl. 18—16)

This invention relates to the manufacture of articles from plastic materials such as synthetic resins and other moldable compounds, and particularly to a press having means for facilitating the handling of the mold plates.

In the molding of small articles from plastic compositions as, for example, bottle and tube caps, a multiple mold is used, enabling a large number of articles to be formed at one time. The mold is formed of two parts, one being a mold plate having cavities or recesses, and the other being an upper plate having studs or projections which register with the cavities or recesses in the lower plate. The two plates are separately charged into the forming press. After the molding operation has been completed and the presses opened, the articles, particularly if they are threaded articles, adhere to the studs or cores on the upper mold plate. This plate is then transferred to a work table where the completed articles are stripped from the mold after which the plate is ready to be used again. The plates for multiple molds are of massive construction weighing in the neighborhood of 150 pounds. They are hot when they are removed from the press and the manipulation of them is laborious and frequently consumes considerable time during which the press itself is idle.

The present invention provides, in conjunction with a press, means for facilitating the handling and supporting of the upper mold plate upon its removal from between the platens of the press and while it is being stripped and again returned to the press. In general the invention comprises the provision of a trolley or like arrangement at the front of the press so that the upper plate, as it is slid from between the platens of the press, may be swung upwardly. When it reaches a vertical position it will engage a trolley or like conveying means to enable it to be slid sideways in either direction from a position directly in front of the press to a position to one side or the other of the press. Two upper mold members are used so that when one is engaged between the platens of the press the other may hang in a vertical position to one side of the press. The one which is removed from between the platens of the press is shifted off to the side of the press away from the other plate on the conveyor, and said other one is then moved into position to be entered in the press. While the curing operation is taking place in the press, the operator can strip the completed articles from the plate which is on the conveyor at one side or the other of the press. The invention further contemplates means arranged adjacent the press in position to receive the articles which are stripped from the plates and effect a separation of the molded articles as they are stripped from the flash which breaks off during the stripping operation. The invention also provides means for counterweighing the upper press plate when it is being moved from the horizontal to the vertical position or from the vertical position to the horizontal position to reduce the effort required to manipulate the plates.

The invention may be readily understood by reference to the accompanying drawings in which Figure 1 shows a front elevation of a press having our invention applied thereto;

Figure 2 is an end elevation of the press shown in Figure 1;

Figure 3 is a top plan view of one of the cap-receiving troughs into which the stripped articles fall as they are removed from the forming molds;

Figure 4 is a detailed view showing a transverse vertical section through a portion of the bottom of the receiving trough of Figure 3;

Figure 5 is a fragmentary view of a portion of a press plate showing a single mold unit with the molded cap in position thereon and illustrating the manner in which the flash forms at the base of the cap;

Figure 6 is a detailed sectional view showing the cross section of a portion of the trolley and the trolley rail.

In the drawings, 2 designates the frame of a conventional press having a head 3 with a platen support 4 to which is secured an upper platen 5. 6 designates the lower press head which is moved up and down with respect to the fixed platen 5 by means of a hydraulic ram (not shown). The lower platen 7 is carried on the head 6 for reciprocation up and down with respect to the upper one. At each side of the upper platen 5 are depending ways or slide bars 8, the forward ends of which project forwardly beyond the platen 5 to a slight extent. These ways or guides provide a support for the upper mold plates which plates are designated generally as 9. The press equipment of the present invention contemplates that there be two of these upper mold plates 9, one of which is in the press as shown in Figure 1 while the other is supported to one side or the other of the press shown in Figure 1 and in the manner hereinafter more fully described. The upper mold plate 9 comprises a rigid metal plate having a plurality of forming cores or studs 10 thereon each of which is adapted to form with a corresponding cavity in the lower mold block 11 a complete individual mold unit. The stud members 10 are frequently threaded for the purpose of forming an internal thread on a plastic article as, for example, forming the thread inside a bottle cap. The studs or cores 10 are arranged in parallel rows across the plate 9 and the plate 9 is of a dimension such that it will just slide between the slides or supporting guides 8. The construction of the press and of the molds heretofore described is old in the art and forms no part of the present invention per se. The mold plates are ordinarily provided with forwardly extending arms 12 having handles 13 to enable the mold plates to be handled and to be slid into and out of position on the guides 8.

According to the present invention a cross strip 14 is secured to the handles 12. On each end of the cross strip 14 is a double flanged trolley wheel 15. Secured to the structure of the press is a trolley rail or strip 16, the strip extending across the front of the press and projecting laterally a considerable distance to each side of it. This strip has an outer flange 16a. At an equal distance from each side of the vertical center of the machine the flange 16a has a notch 17 therein. The rail 16 is at a proper elevation so that when the rollers 15 on the bar 14 attached to the mold plate are riding on the rail, the lower edge of the mold block 9 will be at the exact level of the horizontal flange 8a of the guide strip 8. The arrangement is such that when the mold plate 9 shown in Figure 1 in a horizontal position between the two platens of the press is slid forwardly, it may be then swung in a vertical plane in toward the press while the lower end remains supported on the protruding ends of the guides 8. When the plate reaches a vertical position, the rollers 15 will enter the notches 17, the inner flange of the roller resting on the rail. When the plate is in this position, it may be rolled to the left as viewed in Figure 1 along the track. The plate 9 which is shown at the right-hand side of Figure 9 in the vertical position may then be rolled to the left as viewed in Figure 1 until the rollers 15 register with the notches 17 when the plate may be swung downwardly to a horizontal position and slid into operating position on the guides 8.

To facilitate the raising and lowering of the plates from the vertical to the horizontal position and vice versa, a counterweight means is employed. This comprises a cable 18 having a hook 19 at one end. This cable passes over guide pulleys 20 on the top of the press and has a counterweight 21 at its opposite end. The cross bar 14 attached to the handles of the plate 9 is provided with a central hole 14a. The hook 19 is of a character which can be readily engaged and disengaged in the hole 14a. In manipulating the press, the operator hooks the hook into the plate which is in the horizontal position, raises this plate to a vertical position, and slides it to one side. He may then disengage the hook and without releasing the cable, engage the hook into the eye 14a of the plate which is to be next put into the press. Thus, after the operation has been started, the hook may be always engaged with one or the other of the two plates, although this is not necessary.

When a plate has been moved from a position between the platens of the press to a vertical position at one side or the other of the press as illustrated, for instance, by the plate 9 at the right-hand side of Figure 1, the molded articles which are formed on the cores or plungers 10 are stripped off. A stripping tool of the character commonly provided for work of this kind is used. It comprises a motor driven chuck which is successively applied to the articles. It rotates them to unscrew them from the forming plungers and when they have been unscrewed, they pass axially back through the chuck and fall out a radial opening in the shank of the tool back of the chuck. The mold plates being supported to one side of the front of the press are in a convenient place for the operator to do the stripping while attending to other functions of the press.

Secured to the frame of the press at each side thereof directly under the trolley are horizontal members 22 carrying a series of rollers 23. These rollers are at a level such that they provide a rolling support for the lower edge of the plates 9 as they are moved into and out of the stripping position. At each side of the machine below the plane of the members 22 are receiving hoppers 24 so positioned that as the caps or other articles being stripped from the molds drop down they will fall directly into these hoppers. In the hoppers 24 are inclined screens 25 which are preferably formed of a plurality of parallel angle bars 26 set in the manner shown in Figure 4 with the legs of the angle sloping downwardly. The wall of the hopper is provided with an opening 24a and at the end of the screen is a receiving trough 27. The arrangement is such that when the molded articles are unscrewed from the mold plate, they drop into the hoppers 24 striking the screens 25. The flash which comes off with the caps falls through the screen between the parallel angle bars and out an opening 28 into a waste receptacle 29. The caps slide down the inclined screen and fall into the receiving troughs 27 which are inclined and from which they pass into receiving receptacles (not shown). Spaced wings 31 extending perpendicular to the plane of mold plates on the conveyor and reaching down to the receiving hopper, keep the articles from flying sideways too far, and direct them into the receiving hopper. These plates are spaced forwardly of the trolley so that the mold plates can travel back and forth. In order that the mold plates will be rigidly and solidly supported at the stripping stations, heavy backing plates may be provided, these being designated 32. The plates 31 are spaced from each other at each end of the machine a distance somewhat greater than the studded area of the mold plates so that there is adequate room for the application of the stripping tool to the articles on the several studs.

In the operation of the machine, upon completion of the molding cycle, the press is opened in the usual manner and the mold is slid forwardly from between the platens of the press. When the innermost edge of the upper mold plate is clear of the mold platen, the operator swings the handles 13 upwardly. The counterweight cable 18 is at that time attached to the mold plate and the mold plate is turned to a vertical position. When the trolley wheels 15 enter the recesses 17, the operator pushes the mold plate to one side or the other of the press, depending upon which side is clear to receive the plate. The operator then charges the lower mold part 11 with plastic material, rolls the other of the two upper mold plates into a position directly in front of the press, and when the rollers 15 are in line with the notches 17, the handles 13 are grasped and the mold plate pulled forwardly, the lower edge of the mold plate being supported on the projecting ends of the guides 8. In moving the second mold plate into position, the operator unhooks the counterweight cable hook from the mold plate which has just been removed and connects it to the one which is about to be inserted. When the second mold plate has been brought to a horizontal position, it is slid under the upper mold platen and the pressing cycle is repeated. During the time required for the plastic material to be molded, the operator takes the stripping tool heretofore referred to and strips the completed articles from the plate which has just been removed, the articles falling into the receiving hoppers 24 in the manner previously described. The flash or waste material is separated from the caps.

The time required for manipulating the molds is considerably reduced by reason of this arrangement and the labor of handling the mold plates which are both hot and heavy is materially minimized. An especially desirable advantage of the invention is the provision of the conveying means or the trolley extending to each side of the press to enable the mold plates to be alternately operated, one being in the press while the other is supported in position to be stripped and the manipulation is such that one mold plate is never in a position to interfere with the other. The arrangement enables the full capacity of the press to be much more economically utilized and reduces the amount of time that the press is idle during the charging operation.

While we have illustrated and described one specific embodiment of our invention, it will be understood that this is merely by way of illustration and that various changes and modifications are within the contemplation of our invention and within the scope of the following claims.

We claim:

1. Molding apparatus comprising a molding press having relatively movable press members and a mold plate movable horizontally into and out of position between said members, conveyor means above the plane of the movable press member extending across the front of the press and to the side thereof onto which the mold plate may be set in a vertical plane when it is removed from the press and transferred from a position in front of the press to a position at one side thereof, and means for supporting the mold plate when it is being turned from a horizontal position to a vertical position to engage the conveyor.

2. The combination with a molding press having means therein for receiving a mold plate, of a mold plate adapted to be inserted into and removed from the press, a trolley on the mold plate, and a trolley rail extending across the front of the press in a position where the trolley will engage the rail only when the plate is withdrawn from the press and turned edgewise to a vertical plane, the trolley rail being secured to the front of the press close to the press where it permits the operator ready access to the press.

3. The combination with a molding press having upper and lower relatively movable press members, of a trackway extending across the front of the press and projecting to each side of the press the trackway being close to the plane of the front of the press, said trackway being above the level of said press members, a mold plate adapted to be inserted between said members and removed therefrom, and trolley means on the mold plate positioned to engage the trackway only when the mold plate has been slid horizontally from between said movable members and swung into a vertical position in a direction which carries the forward edge of said plate upwardly and away from the operator.

4. The combination with a molding press having upper and lower relatively movable press members, of a trackway extending across the front of the press and projecting to each side of the press, said trackway being above the level of said press members the trackway being close to the front of the press to avoid obstructing ready access to the movable press members, a mold plate adapted to be inserted between said members and removed therefrom, trolley means on the mold plate positioned to engage the trackway when the mold plate is slid horizontally from between said movable members and swung into a vertical position in a direction which carries the forward edge of said plate upwardly and away from the operator, and a counterweight means releasably connected with the mold plate to facilitate the turning of it into and from the vertical position.

5. The combination with a molding press having upper and lower relatively movable press members, of a trackway extending across the front of the press and projecting to each side of the press, said trackway being above the level of said press members the trackway being close to the front of the press to avoid obstructing ready access to the movable press members, a mold plate adapted to be inserted between said members and removed therefrom, trolley means on the mold plate positioned to engage the trackway when the mold plate is slid horizontally from between said movable members and swung into a vertical position in a direction which carries the forward edge of said plate upwardly and away from the operator, said trackway having notches therein to enable the trolley to become engaged with the trackway when being turned upwardly in this manner and to enable the plate to be turned back to a horizontal position when it is being operated in the reverse direction to return it to the press.

6. The combination with a molding press having upper and lower relatively movable press members, of a trackway extending across the front of the press and projecting to each side of the press, said trackway being above the level of said press members the trackway being close to the front of the press to avoid obstructing ready access to the movable press members, a mold plate adapted to be inserted between said members and removed therefrom, trolley means on the mold plate positioned to engage the trackway when the mold plate is slid horizontally from between said movable members and swung into a vertical position in a direction which carries the forward edge of said plate upwardly and away from the operator, and a counterweight means releasably connected with the mold plate to facilitate the turning of it into and from the vertical position, and a receiving hopper at each side of the press below the trackway for receiving molded articles which are stripped from the mold plate when the mold plate is moved onto the trackway at the side of the press.

7. A molding apparatus comprising a press having relatively movable press members between which a mold plate is movable into and out of position, a trackway at the front of the press having a portion extending to each side of the front of the press, a pair of mold plates, cooperating means on the mold plates and trackway for supporting the plates in a vertical position and for moving them along the trackway to a station directly in front of the press for enabling the disengagement of said cooperating means whereby they may be turned to a horizontal position at such station and entered into the press, the trackway being close to the front of the press in order to permit access to the press members from the front of the press.

8. Molding apparatus comprising a press having horizontal platens between which a mold plate may be horizontally entered and removed, means providing a stripping station at each side of the front of the press, means for transferring mold plates from a position in front of the press to either of the stripping stations, said conveyor means comprising a trackway so positioned close to the front of the press as to give ready access to the press, and means on the mold plate for engaging the trackway only when the mold plate is turned from a horizontal plane to a vertical plane.

9. A molding apparatus comprising a mold plate having a plane surface with a plurality of mold elements thereon, a trolley structure at one edge of said plate to enable said plate to be suspended and moved about in a vertical plane, and handle elements projecting from the same edge of said plate beyond the trolley structure.

10. Molding apparatus comprising a press frame with relatively movable press members therein, a trolley track secured to the frame extending across the frame at the front thereof above the plane of said press members, a trolley member movable along said track and removable from said track, and a mold plate to one edge of which the trolley is secured.

11. Molding apparatus comprising a molding press having relatively movable press members and a mold plate, conveyor means secured to the press above the plane of the movable press members and extending across the front of the press and to the side thereof on which the mold plate is supported in a vertical plane and on which it may be transferred from a position in front of the press to a position at one side thereof, stripped and subsequently returned to the press, said mold plate being removable from the conveyor means, and additional means supported by the press for supporting the mold plate when it is being removed from said conveyor means and transferred to the press.

12. The combination with a molding press having upper and lower relatively movable press members, of a trackway supported by the press and extending across the front of the press and projecting to each side of the press, the trackway being close to the plane of the front of the press, said trackway being above the level of said press members, a mold plate adapted to be moved horizontally, and trolley means on the mold plate removably engaging the trackway.

13. Molding apparatus comprising a press, a mold plate movable into and out of the press, a trolley on the mold plate, and a track extending across the front of the press close to the press in a position to engage the trolley when the mold plate is moved out of the press and swung to a vertical position.

14. Molding apparatus comprising a press, a mold plate, a trolley on the mold plate, and a track on the press and extending across the front of the press and removably supporting the trolley.

ARCHIBALD B. McGINNIS.
WILLIAM B. MERINAR.